(12) United States Patent
Ashmore et al.

(10) Patent No.: US 7,297,193 B1
(45) Date of Patent: Nov. 20, 2007

(54) WAX-BIOCIDE WOOD TREATMENT

(75) Inventors: John William Ashmore, Lansdale, PA (US); David Michael Laganella, Swedesboro, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 11/656,100

(22) Filed: Jan. 22, 2007

Related U.S. Application Data

(60) Provisional application No. 60/763,319, filed on Jan. 30, 2006.

(51) Int. Cl.
| | |
|---|---|
| *C09D 5/14* | (2006.01) |
| *A01N 43/72* | (2006.01) |
| *A01N 43/78* | (2006.01) |
| *B27K 3/50* | (2006.01) |
| *B27K 3/52* | (2006.01) |
| *B05D 7/06* | (2006.01) |

(52) U.S. Cl. .................. 106/18.29; 106/270; 106/272; 427/298; 427/397; 514/372; 514/478

(58) Field of Classification Search ............ 106/18.29, 106/270, 272; 427/298, 397; 514/372, 478
See application file for complete search history.

(56) References Cited

U.S. PATENT DOCUMENTS

| 3,281,318 | A | * | 10/1966 | Stutz ........................... 514/737 |
| 4,085,251 | A | * | 4/1978 | Rak ............................ 428/485 |
| 4,143,010 | A | * | 3/1979 | Rak ............................ 514/433 |
| 4,950,329 | A | * | 8/1990 | McIntyre et al. ......... 106/15.05 |
| 5,635,217 | A | * | 6/1997 | Goettsche et al. .......... 424/632 |
| 5,853,766 | A | * | 12/1998 | Goettsche et al. .......... 424/632 |
| 6,274,199 | B1 | | 8/2001 | Preston et al. |
| 6,441,016 | B2 | * | 8/2002 | Goettsche et al. .......... 514/383 |
| 6,664,327 | B2 | * | 12/2003 | Daisey et al. ............... 524/523 |
| 7,176,171 | B2 | * | 2/2007 | Nieendick et al. .......... 510/123 |
| 2006/0057300 | A1 | | 3/2006 | Cui et al. |

FOREIGN PATENT DOCUMENTS

| CA | 1207952 | A | * | 7/1986 |
| CA | 1276338 | C | * | 11/1990 |
| DE | 19829037 | A1 | * | 1/2000 |
| EP | 0472973 | A1 | * | 3/1992 |
| EP | 1714757 | | | 10/2006 |
| GB | 1069640 | | | 5/1967 |
| JP | 56-99265 | A | * | 8/1981 |
| JP | 61-115975 | A | * | 6/1986 |
| WO | WO01/76837 | A1 | * | 10/2001 |
| WO | WO 03097763 | | | 11/2003 |
| WO | WO 2006117158 | | | 11/2006 |
| WO | WO 2006117160 | | | 11/2006 |

OTHER PUBLICATIONS

Derwent-Acc-No. 1990-201636, abstract of German Patent Specification No. DD275433A (Jan. 1990).*

* cited by examiner

*Primary Examiner*—Anthony J. Green
(74) *Attorney, Agent, or Firm*—Kenneth Crimaldi

(57) ABSTRACT

A method for preserving wood by contacting wood with an aqueous composition comprising a paraffin wax, at least one nonionic surfactant, and at least one organic wood preservative.

11 Claims, No Drawings

WAX-BIOCIDE WOOD TREATMENT

This application claims the benefit of priority under 35 U.S.C. §119(e) of U.S. Provisional Patent Application No. 60/763,319 filed on Jan. 30, 2006.

The present invention relates to a method for treating wood to impart protection from wood-decaying organisms.

Use of polymers, waxes and biocides in organic solvents to treat wood has been reported, for example in U.S. Pat. No. 4,143,010, which discloses treatment of wood with pentachlorophenol, fatty acids or waxes, and synthetic polymers, in an organic solvent such as carbon tetrachloride. However, methods for treating wood without the use of organic solvents are desirable, as is a method for enhancing biocide penetration into the wood.

The problem addressed by this invention is the need for a method of treating wood with biocides and waxes in an aqueous formulation to enhance penetration of biocide into the wood, and a method for stabilizing the aqueous wood treatment formulation.

STATEMENT OF THE INVENTION

The present invention is directed to a method for preserving wood by contacting wood with an aqueous composition comprising: (a) a paraffin wax having a melting point from 45 to 75° C., and an average particle size no greater than 1 micron; (b) at least one nonionic surfactant; and (c) an organic wood preservative.

Organic wood preservatives include, e.g., halogenated 3-isothiazolone biocides, 3-iodopropargyl n-butyl carbamate, propiconazole, tebuconazole, bethoxazin and non-halogenated 3-isothiazolone biocides, e.g., 2-n-octyl-4-isothiazolin-3-one ("OIT").

Additionally, an oil, either a natural or synthetic paraffin oil, such as mineral oil or a crop oil, such as sunflower oil, soybean oil, palm oil or their hydrogenated analogs may also be used to create a more stable wood treatment emulsion. This emulsion may optionally contain an anionic surfactant.

DETAILED DESCRIPTION OF THE INVENTION

All percentages and ppm values are by weight, and are on the basis of total weight of the treatment mixture, unless otherwise indicated. Organic wood preservatives are those not containing metals, except as trace impurities. The halogenated isothiazolone biocide preferably comprises a 3-isothiazolone having a $C_4$-$C_{12}$ N-alkyl substituent, more preferably a chlorinated 3-isothiazolone, and most preferably 4,5-dichloro-2-n-octyl-4-isothiazolin-3-one ("DCOIT").

Waxes suitable for use in the present invention preferably have a melting point (sometimes reported as a softening point) from 45-160° C., preferably no greater than 130° C., alternatively no greater than 75° C., alternatively no greater than 65° C., alternatively no greater than 56° C. Paraffin, such as slack and scale wax, carnauba, polyethylene, polypropylene, oxygenated polyethylene, maleic anhydride modified polypropylene and maleic anhydride $C_8$-$C_{24}$ alkylene copolymers are suitable for use in this invention. More than one wax may be included in the wood treatment mixture. Preferably, the wax has an average particle size no greater than 500 nm, alternatively no greater than 250 nm, alternatively no greater than 120 nm, alternatively no greater than 110 nm, alternatively no greater than 100 nm.

Typical nonionic surfactants include but are not limited to: polyethers, e.g. ethylene oxide and propylene oxide condensates which include straight and branched chain alkyl and alkylaryl polyethylene glycol and polypropylene glycol ethers and thioethers, alkyl phenoxypoly(ethyleneoxy)ethanols having alkyl groups containing from about 7 to about 18 carbon atoms and having from about 3 to about 100 ethyleneoxy units, and polyoxyalkylene derivatives of hexitol, including sorbitans, sorbides, mannitans, mannides and alkyl polyglucosides.

The aqueous composition used to treat wood preferably contains from 300 ppm to 5,000 ppm halogenated isothiazolone biocide, more preferably from 400 ppm to 4,000 ppm, and most preferably from 500 ppm to 2,000 ppm. Preferably, the composition contains from 0.001% to 3% surfactant, more preferably from 0.01% to 1%, and most preferably from 0.02% to 0.7%. In one embodiment of the invention, the surfactant level is from 0.02% to 0.4%. Preferably, the wax solids content of the composition is from 0.5% to 5%, more preferably from 1% to 3%. Preferably, the wax solids to biocide ratio is from 1:1 to 150:1, more preferably from 3:1 to 70:1.

The aqueous wood treatment composition optionally contains a non-aqueous solvent. Preferably, the amount of solvent is from 0.01% to 2%, more preferably from 0.02% to 1%, and most preferably from 0.04% to 0.5%. Suitable solvents include ester and ether solvents having a boiling point of at least 150° C., and preferably a flash point of at least 60° C. Preferably, the aqueous composition is substantially free of other solvents. Examples of suitable solvents include glycols, and their ethers and esters, e.g., TEXANOL (2,2,4-trimethyl-1,3-pentanediol, mono-isobutyrate ester; available from Eastman Co., Kingsport Tenn.), DOWANOL DPM (dipropylene glycol, methyl ether; available from Dow Chemical Co.), DOWANOL PPH (propylene glycol phenyl ether), propylene glycol (PG), dipropylene glycol, dipropylene glycol butyl ether, dipropylene glycol propyl ether, alkyl ethers of tripropylene glycol, such as tripropylene glycol methyl ether, alkyl ethers of ethylene glycol, such as ethylene glycol monobutyl ether and alkyl ethers of diethylene glycol, such as diethylene glycol monobutyl ether, and crop oil esters, such as Archer RC sunflower oil ester.

In certain cases, the resulting wood treatment emulsions are not fully compatible and need additional components to stabilize the emulsion so that the wood can be treated without depositing wax particulates on the surface of the wood. Additional nonionic surfactant (ethylene oxide content from 3-7 moles) up to 10000 ppm can be added (preferred range 100-8000 ppm, more preferred 150-6000 ppm). If additional compatibility is needed, then an oil, as described above, from 0.1 to 1% can be added (preferred range 0.1-1%, more preferred 0.2-0.6%). The ratio of oil to wax is from 2:1 to 1:50 (preferred range is 1:3 to 1:10). Optionally, an anionic surfactant can be added, 0.1-1%, to aid in emulsification (more preferred range 0.2-0.6%). Examples of anionic surfactants that could be used are alkali metal and ammonium salts of alkyl and alkylarylsulfonic acids and $C_{10}$-$C_{24}$ fatty acids. Salts of fatty acids, such as palmitic acid, oleic acid and stearic acid are preferred as they can impart some water repellency. The preferred salts are sodium, potassium, ammonium and hydroxy alkylammonium, such as hydroxyethylammonium or tri(hydroxyethyl) ammonium.

The aqueous compositions used in the present invention may optionally contain additional components including but not limited to stabilizers, dyes, other wood biocides, fungicides and insecticides, antioxidants, metal chelators, radical scavengers, etc. Stabilizers include, e.g., organic and inorganic UV stabilizers, such as, copper oxide or other copper salts or complexes that resist leaching; zinc oxide; iron salts, iron oxide, iron complexes, transparent iron oxide and nanoparticle iron oxide; titanium dioxide; benzophenone and substituted benzophenones; cinnamic acid and its esters and amides; substituted triazines, such as triphenyl triazine and substituted phenyl triazine UV absorbers, benzotriazole and substituted benzotriazole UV absorbers; hindered amine light stabilizers, used individually or in combination. Other wood biocides, fungicides and insecticides include, e.g., those listed in U.S. Pat. No. 6,610,282, e.g., imidachloprid and permethrin. Antioxidants include any commercially available antioxidant compounds, e.g., phosphite antioxidants such as IRGAFOS; lactone antioxidants; phenolic antioxidants such as BHT; ascorbic acid; and IRGANOX and the like. Metal chelators include, e.g., EDTA, NTA, 1,10-phenanthroline, ACUMER 3100, DEQUEST, TAMOL 731, tripolyphosphate and other inorganic and organic compounds and polymers useful in chelating or dispersing metal salts. Radical scavengers include, e.g., TEMPO.

Treatment of wood is performed by contacting the wood with the aqueous composition described herein, preferably under conditions specified in AWPA Standards T1-05, N1-04, N2-04 and references cited therein.

In one preferred embodiment, the treatment mixture is formulated as a ready-to-use emulsion in a single container, with 0.5-5% wax solids, 400-4000 ppm DCOIT, 0-1.5% surfactant(s), and the remainder water.

EXAMPLES

Treatment Mixtures

Preparation of the Wood Treatment Mixture from DCOIT/DOWANOL

DPM/TEXANOL Formulation:

One gallon (3.8 L) of the treatment mixture was prepared by diluting a commercial wax emulsion with tap water to the total weight (minus the weight of biocide to be added) with stirring for 20 minutes at 300 rpm. To the well stirred mixture was slowly added sufficient formulated DCOIT {25% DCOIT and 25% TERGITOL 15-S-5 (branched $C_{15}$ alkyl with 5 ethylene oxide units) dissolved in 1:1 dipropylene glycol methyl ether, all by weight in the DCOIT formulation} to produce a final concentration of 800 ppm or 2500 ppm DCOIT, as indicated in Table 1. The mixture was stirred for 30 minutes, and used as is to treat wood.

Procedure to Treat Wood:

Two 5.5×5.5×1 inch (14×14×2.5 cm) pieces of Southern Yellow Pine are loaded into a 2 L pressure vessel equipment with an inlet tube, gas/vacuum inlet, pressure sensors, dropout valve and level indicators. The vessel is sealed and the pressure is reduced to 26-27 inches of Hg (88-91 kPa) and held for 15-20 minutes. The vacuum is turned off and sufficient treatment mixture is drawn into the vessel to completely cover the wood. The vessel is pressurized to approximately 150 psig (1136 kPa). A pump is used to maintain the liquid level above the wood. When no more treatment mixture is taken up by the wood, the pressure is released and the vessel drained via the dropout valve. The wood can be removed at this point (full cell treatment) or a vacuum can be pulled on he vessel again for approximately 5 minutes, the vessel again drained and then the wood removed (full cell with final vacuum treatment) to partially remove some of the surface moisture from the treated wood. All of the wood reported here was treated via the full cell with final vacuum procedure.

Analysis of the Treatment Mixture and Wood:

A 2 g sample of the as is treatment mixture is analyzed for DCOIT by HPLC. The treatment mixture was found to contain 800 ppm or 1500 ppm of DCOIT, as indicated in Table 1.

Once the wood sample had dried to a constant weight, placed in a constant temperature and humidity room, it was analyzed for DCOIT content. Using a drill press containing a ¾ inch (19 mm) Forstner bit, three holes were drilled in the wood. The location of the holes were on one face, at least ¼ inch (6.4 mm) from the sides and ends and where the grain angle was the most vertical between the two faces. One millimeter sections from each hole at depths of 1, 3 and 10 millimeters were collected, combined and analyzed for DCOIT.

A known weight of wood shaving sample is extracted in methanol by sonication for two hours. The extract is then allowed to cool to room temperature. The cooled extract is analyzed by a reverse phase high performance liquid chromatography. The DCOIT is separated from sample matrix using a 25 cm C18 column using water and methanol as mobile phase. The DCOIT is detected using ultraviolet detector set at 280 nanometers. Concentration of DCOIT in sample is determined by comparing peak area of the DCOIT peak in sample with the DCOIT peak in a standard solution using an external standard calculation method.

Table 1 presents penetration data for DCOIT in wood in ppm at depths of 1, 3 and 10 mm; the average particle size (PS) of the wax emulsion; the melting point (MP) of the wax; the type of surfactant (Wax Surf.) present in the wax formulation (N=nonionic, A=anionic); the wax type; and the stability (S=stable, U=unstable) of the treatment mixture before/during treatment of the wood.

TABLE 1

| wax no. | depth | DCOIT | PS | MP | Wax Surf. | wax type | stability |
|---|---|---|---|---|---|---|---|
| none | 1 | 894 | N/A | N/A | N/A | N/A | S/S |
|  | 3 | 680 |  |  |  |  |  |
|  | 10 | 512 |  |  |  |  |  |
| 1 | 1 | 873 | 90 | 52 | N | paraffin | S/S |
|  | 3 | 684 |  |  |  |  |  |
|  | 10 | 689 |  |  |  |  |  |
| 2 | 1 | 376 | 150 | 85 | A | carnauba | S/S |
|  | 3 | 517 |  |  |  |  |  |
|  | 10 | 493 |  |  |  |  |  |
| 3 | 1 | 441 | 115 | 60/101 | A | paraffin/ | S/U |
|  | 3 | 162 |  |  |  | polyethylene |  |
|  | 10 | 79 |  |  |  |  |  |
| 4 | 1 | 995 | 130 | 60 | N | paraffin | S/U |
|  | 3 | 306 |  |  |  |  |  |
|  | 10 | 276 |  |  |  |  |  |
| 5 | 1 | 893 | 250 | N/A* | A | paraffin | U/U |
|  | 3 | 579 |  |  |  |  |  |
|  | 10 | 371 |  |  |  |  |  |
| 6 | 1 | 633 | 40 | 140 | A | polyethylene | S/U |
|  | 3 | 400 |  |  |  |  |  |
|  | 10 | 182 |  |  |  |  |  |
| 7 | 1 | 953 | 65 | 52/101 | A | paraffin/ | U/U |
|  | 3 | 326 |  |  |  | polyethylene |  |
|  | 10 | 199 |  |  |  |  |  |
| 8 | 1 | 515 | 45 | 136 | N | polyethylene | S/U |
|  | 3 | 270 |  |  |  |  |  |
|  | 10 | 216 |  |  |  |  |  |
| 9 | 1 | 311 | 40 | 157 | N | modified | S/U |
|  | 3 | 259 |  |  |  | polypropylene |  |
|  | 10 | 327 |  |  |  |  |  |
| 10 | 1 | 2181 | 250 | 60 | A | paraffin/ | S/U |

TABLE 1-continued

| wax no. | depth | DCOIT | PS | MP | Wax Surf. | wax type | stability |
|---|---|---|---|---|---|---|---|
| | 3 | 2109 | | | | polybutylene | |
| | 10 | 1850 | | | | | |

*The melting point for this wax was not available

The invention claimed is:

1. A method for preserving wood; said method comprising contacting wood with an aqueous composition comprising:
   (a) a paraffin wax having a melting point from 45 to 75° C., and an average particle size no greater than 1 micron;
   (b) at least one nonionic surfactant; and
   (c) at least one organic wood preservative.

2. The method of claim 1 in which the average particle size is no greater than 120 nm.

3. The method of claim 2 in which said at least one organic wood preservative is a halogenated 3-isothiazolone biocide.

4. The method of claim 3 in which the halogenated 3-isothiazolone biocide is 4,5-dichloro-2-n-octyl-4-isothiazolin-3-one.

5. The method of claim 4 in which the paraffin wax has a melting point no greater than 56° C.

6. The method of claim 5 in which the composition comprises 0.5% to 5% paraffin wax, and 400 ppm to 4000 ppm 4,5-dichloro-2-n-octyl-4-isothiazolin-3-one.

7. The method of claim 6 in which the paraffin wax has an average particle size no greater than 110 nm.

8. The method of claim 1 in which said at least one organic wood preservative is selected from the group consisting of halogenated 3-isothiazolone biocides, 3-iodopropargyl n-butyl carbamate, propiconazole, tebuconazole, bethoxazin and non-halogenated 3-isothiazolone biocides.

9. The method of claim 8 in which the paraffin wax has a melting point no greater than 56° C.

10. The method of claim 9 in which the average particle size is no greater than 120 nm.

11. The method of claim 10 in which said at least one nonionic surfactant has ethylene oxide content from 3-7 moles.

* * * * *